No. 743,211. PATENTED NOV. 3, 1903.
J. G. ALEXANDER.
ROD COUPLING.
APPLICATION FILED MAR. 10, 1903.
NO MODEL.
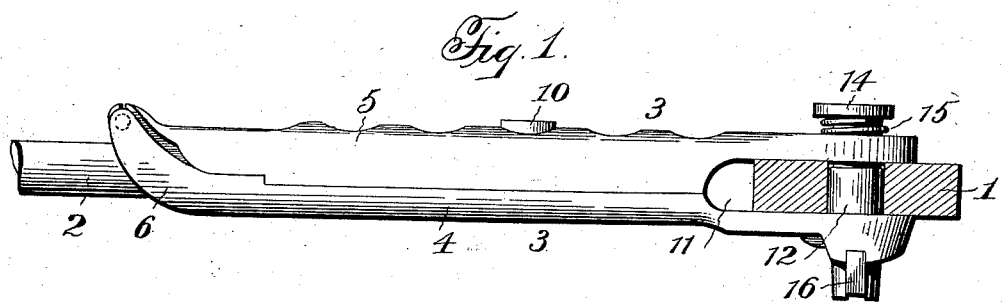
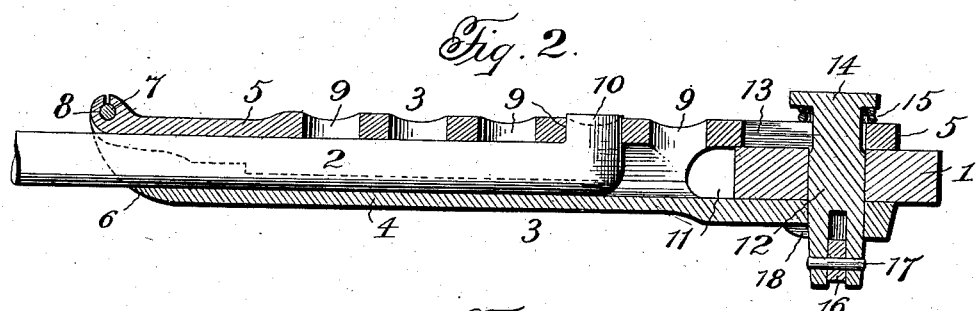
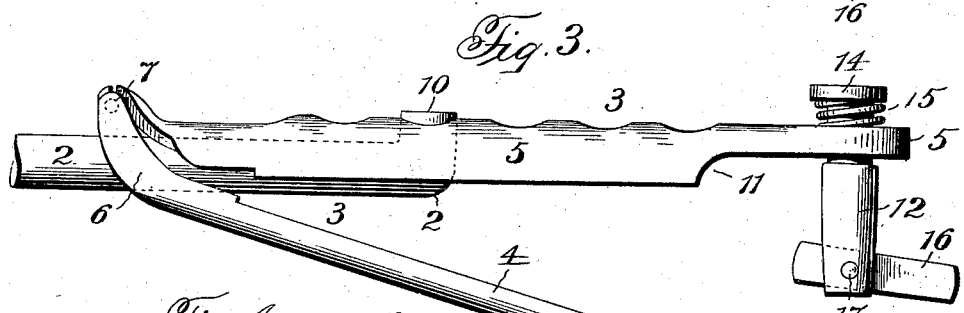
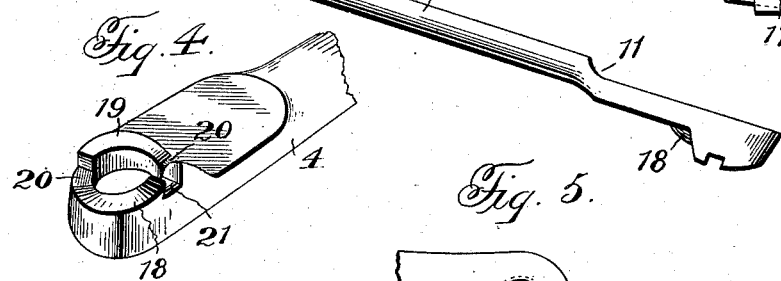
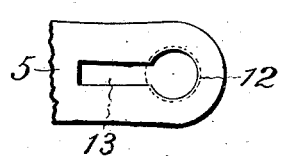
WITNESSES
Jas E Hutchinson
G. G. Nottingham
INVENTOR
James G. Alexander
By H A Seymour
Attorney No. 743,211. Patented November 3, 1903.

UNITED STATES PATENT OFFICE.

JAMES G. ALEXANDER, OF FAIRFIELD, IOWA.

ROD-COUPLING.

SPECIFICATION forming part of Letters Patent No. 743,211, dated November 3, 1903.

Application filed March 10, 1903. Serial No. 147,146. (No model.)

*To all whom it may concern:*

Be it known that I, JAMES G. ALEXANDER, a resident of Fairfield, in the county of Jefferson and State of Iowa, have invented certain new and useful Improvements in Rod-Couplings; and I do hereby declare the following to be a full, clear, and exact description of the invention, such as will enable others skilled in the art to which it appertains to make and use the same.

My invention relates to an improved rod-coupling, and more particularly to a coupling for permitting the adjustment of the length of brake-rods, pitmen, and other like devices, the object of the invention being to provide improvements of this character which will absolutely lock the parts together, yet permit of adjustment when desired, and, further, to provide an improved coupling of simple construction which will not rattle, which will be cheap to manufacture and easy to manipulate, yet secure in use and not liable to get out of order.

With these objects in view the invention consists in certain novel features of construction and combinations and arrangements of parts, as will be more fully hereinafter described, and pointed out in the claims.

In the accompanying drawings, Figure 1 is a view in side elevation illustrating my improvements. Fig. 2 is a view in longitudinal section. Fig. 3 is a view showing the coupling open, and Figs. 4 and 5 are detail views.

1 represents a brake-lever, and 2 a brake-rod connected to the lever by my improved coupling 3. This coupling comprises two semi-cylindrical members 4 and 5, the former having at one end curved arms 6, connected by a journal 7, around which lugs on the member 5 are bent, forming a bearing 8 to turn on said journal and permit the members or jaws 4 and 5 to hinge and open, as shown in Fig. 3. The member 5 is provided with a series of openings 9 to receive in any of which a lug 10, formed by bending rod 2 at right angles, and the free ends of the jaws or members 4 and 5 are cut out or recessed, forming when closed a bifurcation 11 to receive brake-lever 1, pivotally secured therein by a pin 12, located in alined openings in the members 4 and 5. The pin 12 is contracted where it passes through member 5, and the latter has an elongated slot 13 communicating with the opening therein, which permits the opening to be slightly contracted by forcing the walls of the slot toward each other, and thus prevent the accidental escape of the pin from member 5. A head 14 is made on pin 12, and a coiled spring 15 is located on the pin between the head 14 and member 5 to exert a pull on the pin for a purpose which will hereinafter appear. The other end of pin 12, which passes through the opening in member 4, is bifurcated and has secured therein a pivoted bar or key 16 by means of a rivet 17, passed through the bifurcated end of pin 12 and through the pivoted key 16, between the ends of the latter. The outer face of member 4, around the opening therein, is made with semicircular cam-flanges 18 and 19 and recesses 20 between them, and the cam-flange 18 has near its extreme or highest point a notch 21 to receive the long end of pivoted key 16 and secure the pin against rotary movement, and the spring 15 serves to hold the key in this position and prevents any rattling of the coupling.

The operation of my improvements is as follows: When it is desired for any reason to adjust the rod 2, the long end of key 16 is forced out of notch 21 and the pin 12 turned by the key 16 until the ends of the key are in the recesses 20, when the long end of the key can be swung outward, moving the short end thereof into the bifurcation of pin 12. The jaw 4 can then be swung away from jaw 5, journal 7 serving as the hinge. The rod 2 can then be moved to dispose its lug 10 in any of the openings 9 in member 5 and the members moved together again to hold the lug in the opening and, in addition, securely clamp the rod when the jaws are secured together. The key 16 can then be turned at right angles when alining with recesses 21, and by turning the pin by means of the key the ends of the latter will ride up the cam-flanges 18 and 19 until the long end of the key is moved into notch 21 by the action of spring 15 pressing against the head 14 of pin 12, when the parts will be securely locked in position without danger of accidental disconnection.

While I have shown and described my improvements as a brake-rod coupler or adjuster, it is to be understood that it is applicable for many other purposes, and various changes might be made in the general form and arrangements of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. A rod-coupling comprising two members hinged together at one end and open at this hinged end to receive a rod and means for preventing longitudinal movement of the rod when the members are locked together, a pin passed through openings in the free ends of said members and a pivoted key on the end of the pin to secure the pin in position to lock the members together.

2. A rod-coupling, comprising two members adapted to lock a rod between them, a pin passed through openings in one end of the members and having a head at one end and a pivoted cross-key at its other end, of a spring between the head and one member to hold the key in locking position.

3. In a rod-coupling, the combination of two semicylindrical members hinged together at one end, a pin extending through openings in the other ends of the members and having a head at one end, a cross-key pivoted between its ends in the bifurcated end of the pin, a spring on the pin between the head and one member, and a cam-flange on the other member having a notch therein to permit the key to be forced therein by the spring and held therein thereby.

4. In a rod-coupling, the combination of a rod, a lug thereon, two semicylindrical members hinged together, having a series of openings to receive the lug on the rod, the opposite ends of said members being bifurcated, a headed pin passed through alined openings in the bifurcated end of the members and having a head at one end and a pivoted cross-key at its other end, a spring on the pin between the head and a member, and semicircular cam-flanges around the opening in the other member and adapted to be engaged by the ends of the cross-key, and a notch formed in one of said cam-flanges, in which the key is held by the spring.

In testimony whereof I have signed this specification in the presence of two subscribing witnesses.

JAMES G. ALEXANDER.

Witnesses:
J. E. ROTH,
JOS. RICKSHER.